Feb. 13, 1962 J. L. ANDERSON 3,021,439

SUPERCONDUCTIVE SHIFT REGISTERS

Filed Dec. 18, 1959 5 Sheets-Sheet 1

INVENTOR
JOHN L. ANDERSON
Thomas & Crickenberger
ATTORNEYS

United States Patent Office 3,021,439

Patented Feb. 13, 1962

3,021,439

SUPERCONDUCTIVE SHIFT REGISTERS

John L. Anderson, Poughkeepsie, N.Y., assignor to International Business Machines Corporation, New York, N.Y., a corporation of New York Filed Dec. 18, 1959, Ser. No. 860,582
15 Claims. (Cl. 307—88.5)

Figure 1:
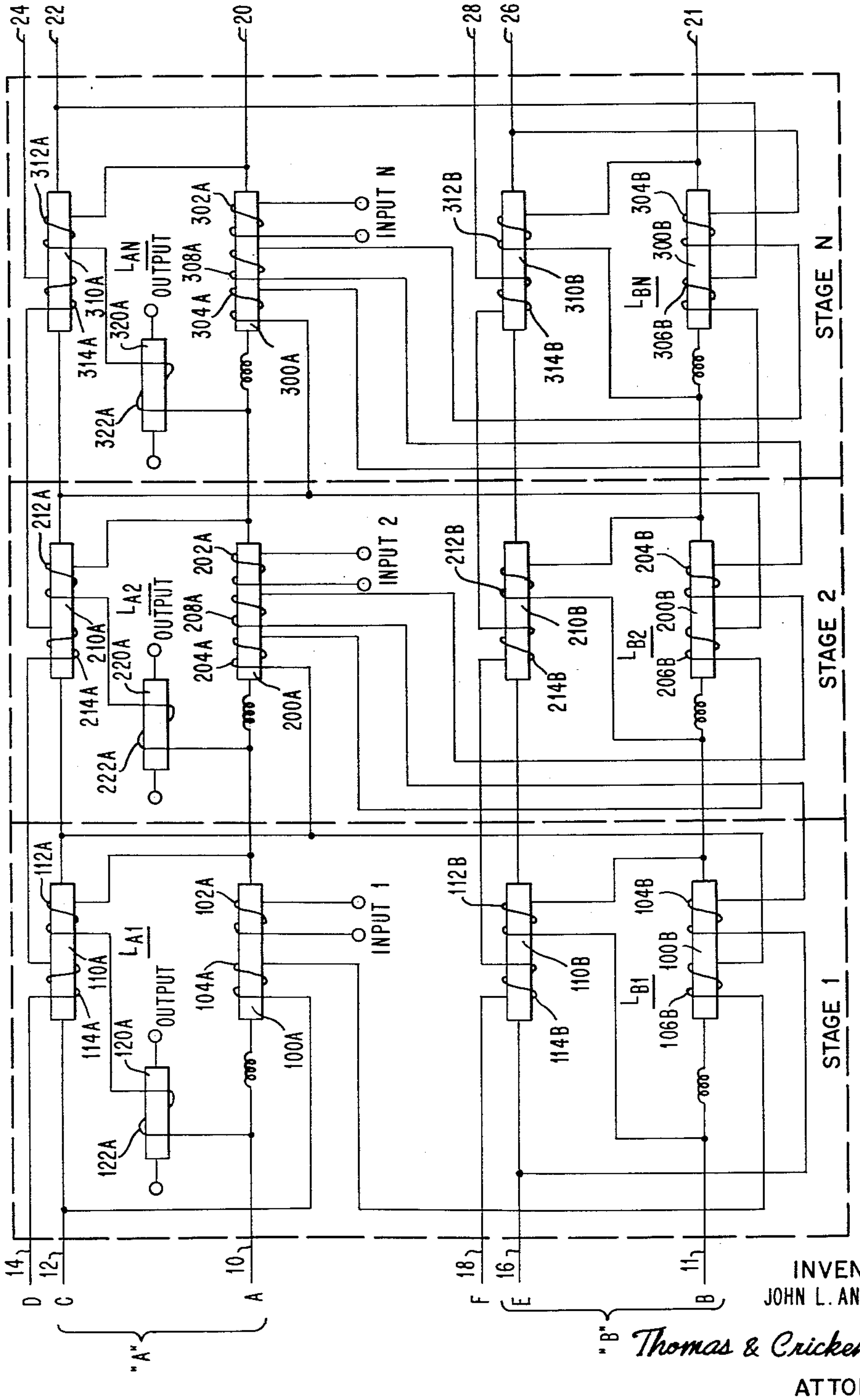

The present invention relates to superconductive devices and more particularly to such devices which are employed as shift registers.

Shift register circuits generally include a number of identical stages connected together in serial fashion. Each stage has a storage device and the stages are interconnected by transfer or coupling circuits. Information entered into one or more of the storage devices is advanced in step-by-step fashion along the chain in response to a series of shift pulses. In some shift registers it is customary to employ flip-flop circuits as the storage elements.

In superconductive shift registers, the flip-flop circuits utilize cryotrons, which are superconductive switching elements comprising a superconductive straight wire surrounded by a coil whose magnetic field controls the superconductive properties of the straight wire. In such flip-flop circuits, which generally employ six cryotrons, information is stored by diverting current from one path to another in the flip-flop. The path of the current determines whether a One or Zero is stored.

Ring circuits, which are somewhat similar to shift register circuits, include a number of stages with each stage having a storage device. Information entered into one stage of the ring is shifted around the ring in response to a series of shift pulses. In certain superconductive ring circuits, a persistent current indicative of a binary One or Zero is stored in a loop circuit in one stage. The information is shifted around the ring circuit by establishing persistent current in the succeeding stage while destroying the persistent current in the preceding stage. In such ring circuits information can be entered into only one stage of three stages because of the interlocking relationship of the persistent current loop circuits of the ring circuit stages.

The shift registers of the present invention include a plurality of interconnected stages, each of which is capable of receiving and storing input information. Each of the stages of the shift register includes no more than five cryotrons, thus resulting in a saving of at least one cryotron over the shift register circuits which employ flip-flop circuits. The cryotrons of each stage are arranged to provide one or more parallel circuits, each defining a loop circuit in which information may be stored in the form of a persistent current. Upon the application of shift pulses, the information stored in any stage, as indicated by a persistent current in a loop circuit thereof, is shifted to the next succeeding stage after first shifting this information to a temporary storage loop circuit. One of the cryotrons of each stage is arranged to provide an output indicative of the presence or absence of a persistent current in that particular stage. The invention further provides for the storage and transfer of decimal information by establishing persistent currents in the loop circuits of the shift register of a magnitude indicative of decimal bits.

One feature of the present invention is in the provision of a superconductive shift register in which information, in the form of a persistent current, may be stored in a stage thereof and shifted through the register in response to pulses applied thereto.

According to another feature of this invention, a superconductive decimal shift register is provided in which decimal information, in the form of a persistent current of a particular magnitude, is stored in a stage of the register and shifted from stage to stage in response to shift pulses.

A further feature of the present invention is the provision of a superconductive shift register in which information stored in the form of persistent currents is first shifted to temporary storage circuits and then to succeeding stages in the register.

Figure 1A:
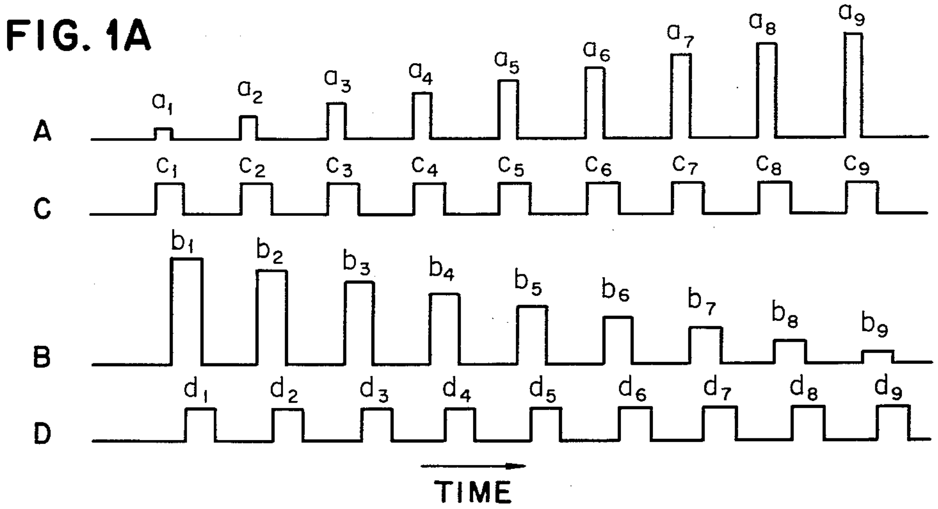
Figure 1B:
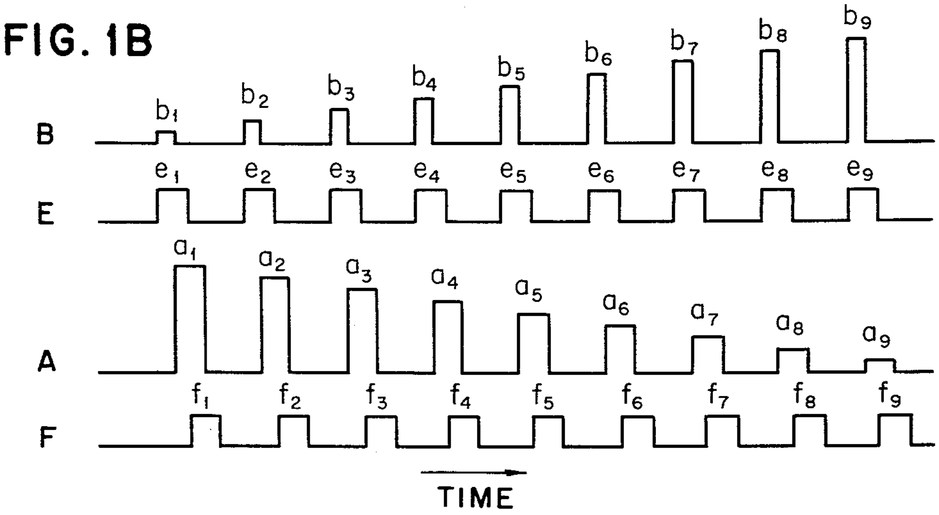
Figure 1C:
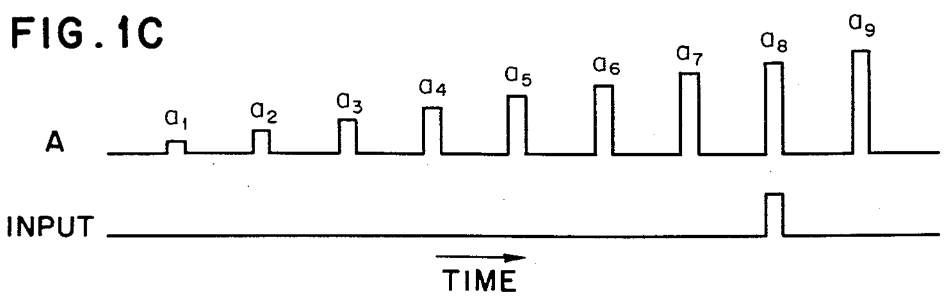
Figure 2:
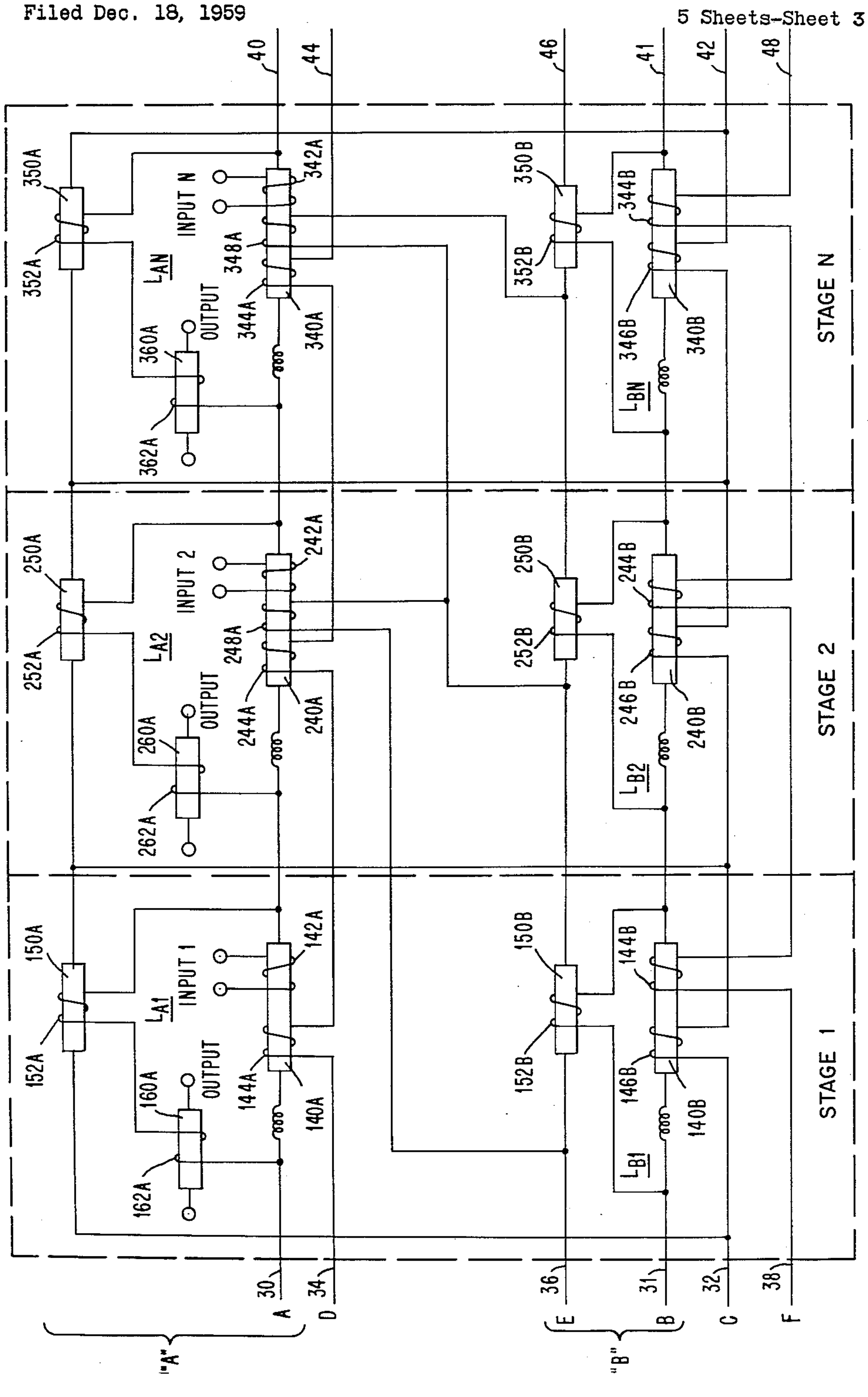
Figure 2A:
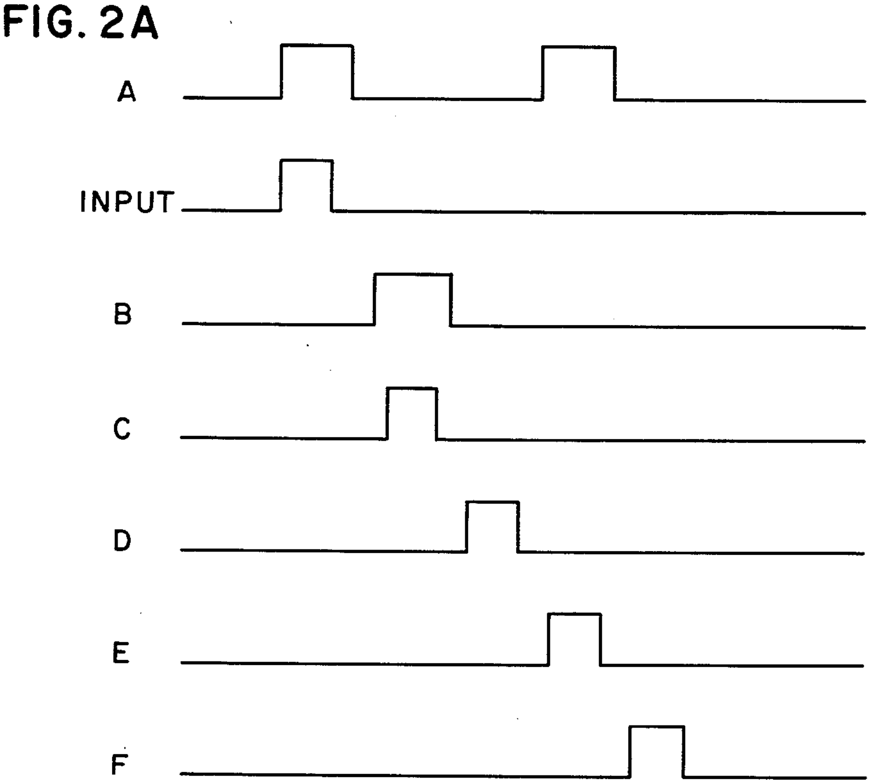
Figure 3A:
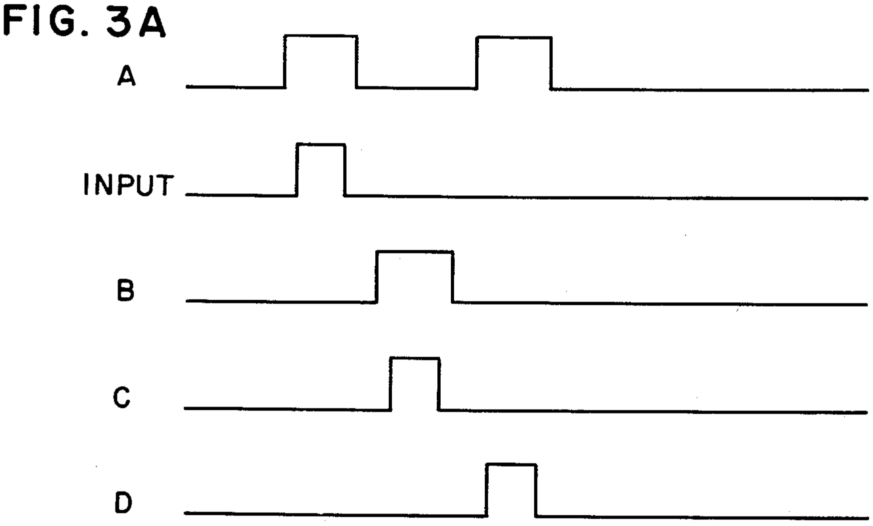
Figure 3:
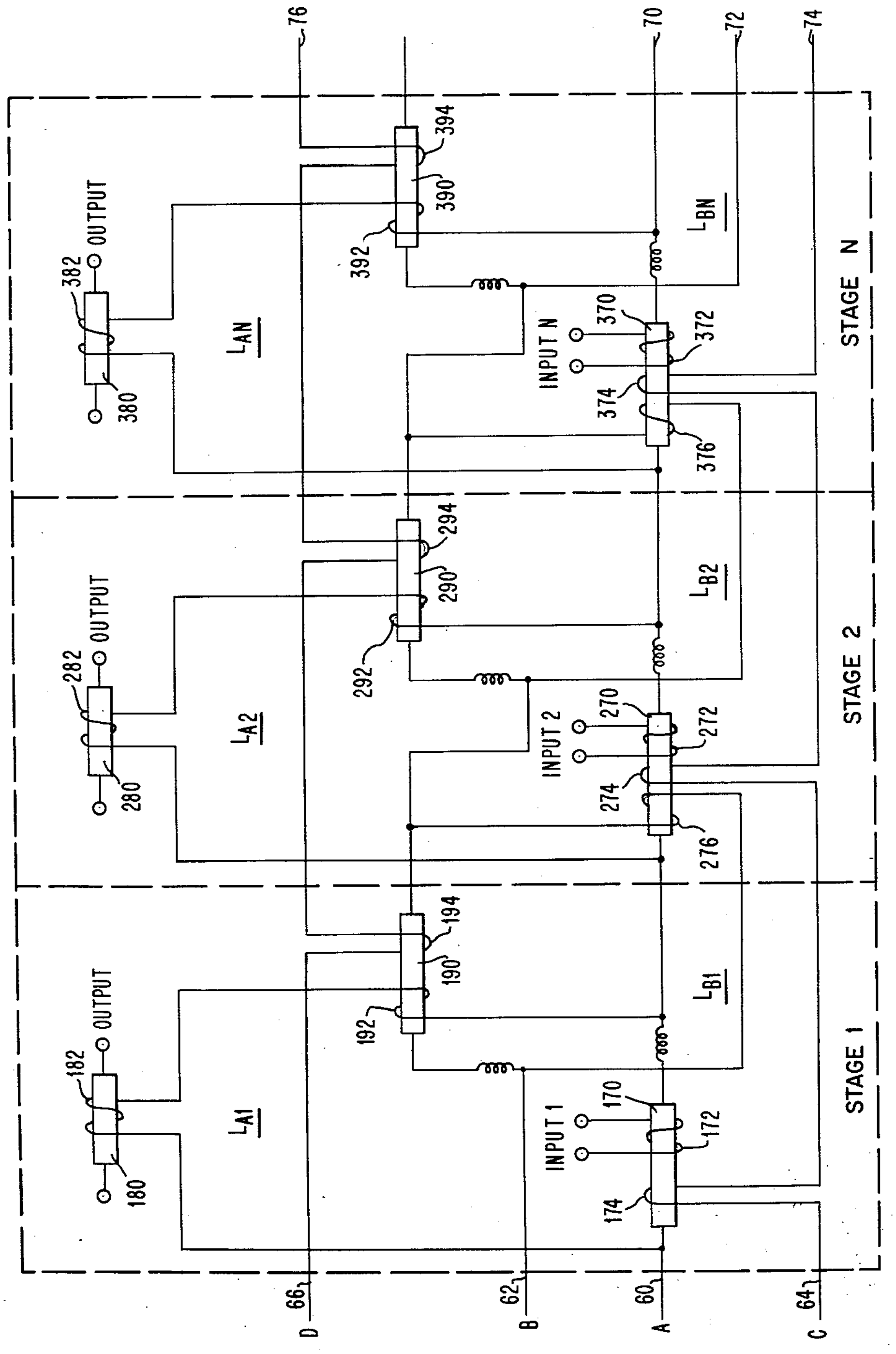

These and other features of this invention may be more fully appreciated when considered in the light of the following specification and the drawings in which:

FIG. 1 illustrates a decimal shift register according to this invention;

FIGS. 1*a* and 1*b* illustrate the control pulses applied to the shift register of FIG. 1;

FIG. 1*c* illustrates the pulse waveforms and pulse timing for storage of information in one stage of the shift register of FIG. 1;

FIG. 2 illustrates a binary shift register according to this invention;

FIG. 2*a* illustrates the pulses applied to the shift register of FIG. 2;

FIG. 3 illustrates another binary shift register according to the present invention; and FIG. 3*a* illustrates the pulses applied to the shift register of FIG. 3.

The shift register circuit illustrated in FIG. 1 is of the decimal type; that is, one in which decimal bits may be stored and shifted through the register. The shift register of FIG. 1 is comprised of an "A" register including the two upper rows of cryotrons and an upper row of loop circuits $L_{A1}$, $L_{A2}$ and $L_{AN}$, and a "B" register including the two lower rows of cryotrons and consequently a lower row of loop circuits $L_{B1}$, $L_{B2}$ and $L_{BN}$. Three stages are illustrated, Stage 1, Stage 2 and Stage N. Each of these stages includes two of the "A" register cryotrons and two of the corresponding "B" register cryotrons, and an "A" register output cryotron.

The cryotrons employed in the shift registers of the present invention include a gate element and one or more windings thereon. For example, in Stage 1 of FIG. 1, the uppermost cryotron includes a gate element 110A, a winding 112A and a winding 114A. Each of the cryotron gate elements in the shift registers of this invention is constructed of a material which is in a superconductive state at the operating temperature of the circuit in the absence of a magnetic field, but is driven resistive by the magnetic field produced when a current greater than a predetermined minimum or threshold current is present in its control winding or windings. The remaining portions of the circuit, that is, the cryotron windings and the connections between the various cryotron components are fabricated of a superconductive material which remains in a superconductive state under all conditions of circuit operation. For example, the gate elements may be fabricated of tantalum, and the remaining portions of the circuit may be fabricated of lead or niobium, or other materials such as those described in the article by Dudley Buck which appeared in the Proceedings of the IRE, April 1956, pp. 482–493. The particular gate elements employed and the remaining portions of the circuit, along with the particular currents used are chosen so that the current through a component of the circuit (gate elements, windings and connecting lines) does not drive that particular component resistive or normal. For example, the current through the upper row of gate elements 110A, 210A and 310A of FIG. 1 will not, at any instant, drive these gates resistive or normal. However, when a particular magnitude of current is present in the winding 112A or the winding 114A, for example, the gate element 110A will go resistive or normal. It should be noted at this point that, though the cryotrons are shown in the drawings to be of the wire wound type since it is believed that this type of presentation provides a more graphic illustration, film type cryotrons are preferably employed in circuits constructed and operated in accordance with the principles of the subject invention. For detailed discussions of film type cryotrons and the manner in which they are constructed, reference may be made to co-pending applications Serial No. 625,512 and Serial No. 765,760, filed November 30, 1956 and October 7, 1958, respectively, both of which have been assigned to the assignee of this invention.

Referring again to FIG. 1, a plurality of loops or loop circuits $L_{A1}$, $L_{A2}$ and $L_{AN}$ are employed in the "A" register in which decimal information may be stored. The first of these loops $L_{A1}$, is defined by a parallel circuit in which a gate element 100A is connected in parallel with a series circuit including windings 112A and 122A. The second of these loops, $L_{A2}$, is defined by a parallel circuit including a gate element 200A connected in parallel with a series circuit including windings 212A and 222A. The third loop $L_{AN}$, is defined by a parallel circuit including a gate element 300A connected in parallel with a series circuit including windings 312A and 322A. The "B" register comprises three loop circuits $L_{B1}$, $L_{B2}$ and $L_{BN}$ which are employed for the temporary storage of information. The first loop, $L_{B1}$, includes a parallel connection of a gate element 100B with a winding 112B. The second and third temporary storage loops, $L_{B2}$ and $L_{BN}$, include a gate element 200B connected in parallel with a winding 212B and a gate element 300B connected in parallel with a winding 312B, respectively.

The Stages, 1, 2 and N, of the shift register of FIG. 1 have input windings 102A, 202A and 302A, respectively, which are employed to store information in the respective stages. These stages also include gate elements 120A, 220A and 320A, respectively, for providing an indication of the information stored. Input control lines 10, 11, 12, 14, 16 and 18 are provided to which control current pulses A, B, C, D, E and F of FIGS. 1*a* and 1*b* are applied, respectively, from suitable pulse sources not shown. These pulses are returned to the respective pulse sources through lines 20, 21, 22, 24, 26 and 28.

According to one of the features of the present invention; decimal information in the form of quantized currents is entered into the "A" register of FIG. 1. By applying the pulses shown in FIG. 1*a* this information, also in the form of quantized currents, is shifted into the "B" register for temporary storage. The subsequent application of the pulses shown in FIG. 1*b* causes the information to be transferred from the "B" register back to the "A" register, shifted one place to the right. In transferring from the "A" register to the "B" register the "nines" are transferred first, followed by the "eights," "sevens," etc. The same sequence of transfer of information applies when shifting from the "B" register to the "A" register. It will be apparent from the following specific description of operation of the shift register that a digit of information is re-quantized, as is illustrated by the B and the A pulses of FIG. 1*a* and FIG. 1*b*, respectively when transferred so that no degradation of information can occur.

The specific operation of the shift register of FIG. 1 will now be described in connection with the pulses illustrated in FIGS. 1*a*, 1*b* and 1*c*. In loading the "A" register, correctly quantized currents, such as, the A pulses of FIG. 1*c*, are applied in succession to a line 10. The input coils 102A, 202A and 302A are energized at the proper times so that the desired quantized current is stored in each of the loops $L_{A1}$, $L_{A2}$ and $L_{AN}$. In order to store a persistent current in a loop of superconductive material, it is necessary to apply a current to the loop in such a way as to provide a net flux threading the loop and, thereafter, remove the applied current at a time when the loop is entirely superconductive. Since it is a characteristic of the phenomena of superconductivity that the net flux threading a completely superconductive loop cannot be changed, a persistent current is established in the loop to maintain the net flux threading the loop constant when the externally applied current signal is removed. As has been previously described, each loop of the shift register is fabricated to include two current paths which are connected in parallel across the current supply means for the loop. A portion of one of these paths is maintained in a resistive state while a current pulse is being applied to the loop to cause the pulse to be directed into the other of the parallel paths. By causing the applied current pulse to be directed to one of the paths in this way, a net flux threading the loop is provided. Thereafter, the loop is allowed to become completely superconductive and then the applied pulse is terminated causing a persistent current to be established in the loop. For example, assume that an "eight" is to be stored in Stage 1 of FIG. 1. All of the gate elements of the shift register are superconductive. The A pulses of FIG. 1*c* are applied to line 10 and they flow through the parallel paths of loops $L_{A1}$, $L_{A2}$, and $L_{A3}$. Upon the occurrence of the eighth A pulse of FIG. 1*c*, $a_8$, an input pulse as shown in FIG. 1*c* is applied to the input winding 102A of Stage 1. This input pulse causes the gate element 100A to go resistive, or normal, thereby causing a diversion of the entire pulse $a_8$ through the path of loop $L_{A1}$ which includes the winding 122A and the winding 112A. The input pulse applied to the winding 102A terminates before the pulse $a_8$ and, therefore, upon the termination of the pulse $a_8$, a persistent current is established in the loop $L_{A1}$. The magnitude of the stored current is directly related to the magnitude of the quantized A pulses and the ratio of the inductances of the two paths forming the loop. Thus, it should be apparent, that any decimal bit "one" through "nine" may be stored in any one of the stages of the shift register of FIG. 1. The loops $L_{A1}$, $L_{A2}$, $L_{AN}$, $L_{B1}$, $L_{B2}$, $L_{BN}$, in which persistent currents are stored are formed of paths having equal inductance. With this arrangement the magnitude of the stored current is equal to one-half the magnitude of the quantized A pulse, which is used to set up the stored current. Further, when pulses are subsequently applied to these loops after a persistent current has been stored, the applied pulses divide equally between the parallel paths, increasing the net current in the path including the windings (e.g. 122A and 112A of loop $L_{A1}$). For a more detailed discussion of persistent current storage, reference may be made to co-pending application Serial No. 781,749, filed on December 19, 1958, which has been assigned to the assignee of the present invention.

Assuming for purposes of illustration that an "eight" is stored in the loop $L_{A1}$ of Stage 1, the shift register operates as described below. The gate elements 110A, 210A and 310A of the upper row of cryotrons of the "A" register are not caused to go resistive by a current circulating in one of the "A" register loops having a magnitude indicative of a decimal digit "one" through "nine." However, when the magnitude of the current in windings 112A, 212A and 312A reaches a value greater than nine, the gate elements, 110A and 120A, 210A and 220A or 310A and 320A, go resistive. The first set of A, C, B and D current pulses of FIG. 1*a* applied to the shift register of FIG. 1 has no effect thereon since it has been assumed that an "eight" is stored in Stage 1 and no decimal bits are stored in the remaining stages. Pulse $a_1$ divides equally between the parallel paths of loops $L_{A1}$, $L_{A2}$ and $L_{AN}$. This $a_1$ pulse adds one unit of current to the persistent current circulating in the windings 122A and 112A of loop $L_{A1}$, making it a magnitude of "nine" which is insufficient to drive the gates 110A and 120A resistive. A major part of the first C pulse, $c_1$, flows in the gates 110A, 210A and 310A. Because of the inverse inductive split of current between parallel paths in a superconductive network, only a small fraction of this pulse flows through the windings 104A, 106B, 204A, 206B, 304A and 306B and this is insufficient to drive any of the gates within these windings resistive. This first B pulse, $b_1$, divides evenly between the parallel paths forming loops $L_{B1}$, $L_{B2}$, and $L_{BN}$. The first D pulse, $d_1$, flows through the windings 114A, 214A and 314A thereby driving the gates 100A, 210A and 310A resistive. Upon the termination of the $d_1$ pulse, the gates 110A, 210A and 310A return to their superconductive states. It should now be apparent that the first set of A, C, B and D current pulses has no effect on the shift register since an "eight" is stored therein.

The second application of the A, C, B and D current pulses shifts the information in Stage 1 from the "A" register to the "B" register. Since an "eight" is stored in the loop $L_{A1}$ and the second of the quantized A pulses, $a_2$, represents a magnitude or a value of "two," the portion of this pulse which flows through the windings 122A and 112A adds sufficient current to the persistent current in the loop $L_{A1}$ to drive the gates 110A and 120A resistive. The second C pulse, $c_2$, is blocked by the resistive gate 110A and, therefore, must flow through the windings 104A and 106B. The path through which the $c_2$ pulse flows is the line 12, the winding 104A, the winding 106B, the gate 210A and the gate 310A. It should be noted at this point that when a current pulse is diverted from a first to a second parallel path in a superconductive circuit by reason of a gate element in the first path going resistive, the current pulse remains so diverted even though the gate element goes superconductive unless it is forced to flow in the first path. For example, the $c_2$ pulse described above continues to flow in the windings 104A and 106B even after the gate 110A goes superconductive. The $c_2$ pulse drives the gates 100A and 100B resistive, but the circuit is designed so that the gate 100B goes resistive before the gate 100A. The same is also true of the gates 200B and 200A and the gates 300B and 300A, respectively. In designing particular gates to go resistive before others, different gate elements may be employed or the ampere turns on the gate elements may be different, as desired. When the second B pulse, $b_2$, is applied, it is blocked by the resistive gate 100B, and therefore, this pulse flows through the winding 112B, the gate 200B and the gate 300B. Upon the subsequent termination of the pulse $c_2$ which allows the gate 100B to go superconductive, and then termination of the pulse $b_2$, a persistent current of a magnitude representative of th edecimal "eight" is established in the loop $L_{B1}$. Before the termination of the pulse $c_2$, the gate 100A goes resistive thereby quenching or destroying the persistent current flowing in the loop $L_{A1}$. The application and termination of the pulse $c_2$ along with the gate 110A going superconductive during this pulse may result in a persistent current being established in a third loop defined by the winding 104A, the winding 106B and the gate 110A. However, the second D pulse $d_2$ flows in the winding 114A, the winding 214A and the winding 314A thereby making the gates 110A, 210A and 310A resistive. When the gate 110A goes resistive, a persistent current flowing in the third loop is destroyed. From the foregoing description, it now should be apparent that the "eight" initially established in the loop $L_{A1}$ is shifted to the temporary loop $L_{B1}$.

The transfer of information from the "B" register of Stage 1 to the "A" register of Stage 2 is similar to the transfer of this information from the "A" register of Stage 1 to the "B" register of Stage 1. To accomplish this transfer, the pulses illustrated in FIG. 1*b* are applied to the shift register. The pulse waveforms and the timing of the pulses of FIGS. 1*a* and 1*b* are the same and, therefore, the same pulse sources may be used in the transfer of information from the "A" register to the "B" register and from the "B" register to the "A" register. Suitable switching circuits, which will be apparent to those skilled in the art, may be employed to switch the pulse sources to the proper input and output control lines.

The first set of B, E, A and F current pulses has no effect on the "eight" now stored in the temporary loop $L_{B1}$, since the first B pulse, which divides equally between the two parallel paths of the loop, does not add sufficient current to the persistent current in winding 112B to render the gate 110B resistive. The pulse $b_1$ flows through the gates 100B, 200B and 300B. The major portion of the first E pulse, $e_1$, flows through the gates 110B, 210B and 310B. A small fraction of the pulse $e_1$ flows through the windings 104B and 208A, the windings 204B and 308A and the winding 304B due to the inverse inductive split of current between parallel paths, but this fraction of current is not sufficient to render the gates within these windings resistive. The first A pulse, $a_1$, flows through the parallel paths (the gate 100A and the windings 122A and 112A, the gate 200A and the windings 222A and 212A and the gate 300A and the windings 322A and 312A) of the "A" register, but the current through these paths is insufficient to drive any of the gates resistive. The first F pulse, $f_1$, flows through the windings 114B, 214B and 314B thereby driving the gates 110B, 210B and 310B, respectively resistive. Since none of these gates is in the loop $L_{B1}$, the stored persistent current therein is not affected.

The second B pulse, $b_2$, adds sufficient current to the persistent current in the loop $L_{B1}$ to cause the gate 110B to go resistive. Pulse $e_2$ is now blocked by the resistive gate 110B and, therefore, flows through the windings 104B and 208A, the gate 210B and the gate 310B. The pulse $e_2$ drives the gates 100B and 200A resistive, but the gate 200A is designed to go resistive before the gate 100B. Pulse $a_2$ flows through the gate 100A, is blocked by the resistive gate 200A and flows through the windings 222A and 212A and the gate 300A. Upon the termination of the pulse $e_2$, which allows the gate 200A to go superconductive, and then the termination of the pulse $a_2$, a persistent current of a magnitude indicative of the decimal "eight" is established and stored in the loop $L_{A2}$. Before the termination of the pulse $a_2$ the gate 100B goes resistive, because of pusle $e_2$ flowing in the winding 104B, thereby destroying the persistent current circulating in the loop $L_{B1}$. Pulse $f_2$ is applied to the line 18 and flows through the windings 114B, 214B and 314B thereby driving the gates 110B, 210B and 310B, respectively, resistive. The pulse $f_2$ is applied to destroy the persistent current in the loop defined by the winding 104B, the winding 208A and the gate 110B which may be established when the persistent current in loop $L_{B1}$ allows the gate 110B to go superconductive followed by the subsequent termination of the $e_2$ pulse.

The operation of the shift register of FIG. 1 in which an "eight" is stored in the loop $L_{A1}$ of the "A" register, transferred to the loop $L_{B1}$ of the "B" register and subsequently transferred to the loop $L_{A2}$ in Stage 2 of the "A" register should now be apparent. The subsequent application of a set of $a_2$, $c_2$, $b_2$ and $d_2$ pulses transfers the information stored in the loop $L_{A2}$ to the loop $L_{B2}$, and the subsequent application of a set of $b_2$, $e_2$, $a_2$ and $f_2$ pulses transfers this information from the loop $L_{B2}$ to the loop $L_{AN}$ in the same manner as described above. The information stored in any of the stages of the "A" register may be read out by interrogating the output gates 120A, 220A and 320A during the application of the A pulses. In the illustration given above, the "eight" transferred to the loop $L_{A2}$ may be read from this stage during the application of the pulse $a_2$ which adds sufficient current to the persistent current in that loop to drive the output gate 220A resistive. As another example, assume that a "two" is stored in the loop $L_{A2}$. In this case, the output gate 220A goes resistive during the pulse $a_8$ thereby giving an indication of the information stored in the loop $L_{A2}$. The necessary circuitry for performing the readout operation has not been illustrated because it is believed that such circuitry will be apparent to those skilled in the art. It is only necessary to determine whether an output gate is resistive or not to read information from a stage.

The magnitude of the persistent current in any of the loops in the shift register of FIG. 1 determines when the information indicated by that persistent current will be transferred to another stage, and also, when this information may be read out. In other words, the information in a loop may not be transferred to another loop or read out until an A or B pulse arrives which has a magnitude sufficient to add enough current to the persistent current stored in that loop to drive the gate elements within the windings of the loop resistive.

According to another feature of this invention, decimal bits other than an "eight" may be stored in any or all of the stages of the shift register by employing the A pulses shown in FIG. 1*c* and suitable input pulses. The operation of the shift register with other decimal bits stored therein is similar to that set forth in the description above. For example, assume that a "four" is to be stored in Stage 1 and a "six" is to be stored in Stage 2 and that no information is to be stored in Stage N. Properly quantized currents such as the A pulses of FIG. 1*c* are applied to line 10. During the occurrence of the fourth A pulse, $a_4$, the gate element 100A is driven resistive by an input pulse applied to the winding 102A. The input pulse is terminated before the pulse $a_4$ and upon the termination of pulse $a_4$ a persistent current is established in the loop $L_{A1}$ having a magnitude indicative of a decimal bit "four." During the occurrence of the sixth A pulse, $a_6$, the gate element 200A is made resistive by an input pulse applied to the winding 202A. The input pulse to the winding 202A is removed and upon the termination of the pulse $a_6$ a persistent current is established in the loop $L_{A2}$ indicative of a decimal bit "six." The pulses A, C, B and D of FIG. 1*a* are now applied to the shift register and upon the occurrence of the fourth set of these pulses, $a_4$, $c_4$, $b_4$ and $d_4$, a persistent current indicative of a "four" is established in the loop $L_{B1}$ and the persistent current in $L_{A1}$ is destroyed. Upon the occurrence of the sixth set of the pulses of FIG. 1*a*, $a_6$, $c_6$, $b_6$ and $d_6$, a persistent current indicative of a "six" is established in the loop $L_{B2}$ and the persistent current in the loop $L_{A2}$ is destroyed.

The other sets of pulses of FIG. 1A have no effect on the information stored in the shift register. The "four" in Stage 1 and the "six" in Stage 2 are now temporarily stored in the "B" register. In order to transfer this information to the "A" register the pulses of FIG. 1*b* are applied. Upon the occurrence of the fourth set of the B, E, A and F pulses, $b_4$, $e_4$, $a_4$ and $f_4$, a persistent current is established in the loop $L_{A2}$ indicative of a "four" and the persistent current in the loop $L_{B1}$ is destroyed. When the sixth set of these pulses is applied, a persistent current is established in the loop $L_{AN}$ indicative of a "six" and the persistent current in the loop $L_{B2}$ is destroyed. Upon the subsequent application of the pulses of FIG. 1*a* and FIG. 1*b* the information now stored in loops $L_{A2}$ and $L_{AN}$ is shifted one place to the right. Although only three stages have been illustrated and described, additional stages may be employed as desired. The pulses shown in FIGS. 1*a* and 1*b* are not necessarily of the exact magnitude required for operation of the shift register of FIG. 1, but they are illustrated primarily to show the waveforms and the relative timing of the different pulse trains. The particular magnitude of current necessary to drive the gate elements of the cryotrons resistive depends upon the ampere turns of the control winding or windings of the cryotrons and the inductance of the circuit.

Although the embodiment shown in FIG. 1 has been illustrated and described with respect to the storage and transfer of decimal information, it is to be understood that this was for the purpose of illustrating a preferred embodiment, and that information of other bases may be stored and transferred by employing input and control pulses of different magnitudes from those shown and/or different circuit constants without departing from the concepts of the present invention.

The shift register illustrated in FIG. 2 is of the binary type. This shift register comprises an "A" register including the two upper rows of cryotrons and an upper row of loop circuits $L_{A1}$, $L_{A2}$ and $L_{AN}$, and a "B" register including the two lower rows of cryotrons and consequently a lower row of loop circuits $L_{B1}$, $L_{B2}$ and $L_{BN}$. Three stages are illustrated, Stage 1, Stage 2 and Stage N, each of which includes two of the "A" register cryotrons and two of the corresponding "B" register cryotrons and an "A" register output cryotron. Although only three stages are illustrated, it should be apparent that more stages may be employed if desired.

The first loop or loop circuit, $L_{A1}$, of the "A" register is defined by a parallel circuit in which a gate element 140A is connected in parallel with a series circuit including the windings 162A and 152A. The second of these loops, $L_{A2}$, is defined by a parallel circuit including the gate element 240A connected in parallel with a series circuit which includes the windings 262A and 252A. The third loop, $L_{AN}$, is defined by a parallel circuit comprising a gate element 340A connected in parallel with a series circuit including the windings 362A and 352A. The three loop circuits of the "B" register are employed for the temporary storage of information. The first loop, $L_{B1}$, includes the parallel connection of a gate element 140B with a winding 152B. The second and third temporary storage loops, $L_{B2}$ and $L_{BN}$, include a gate element 240B connected in parallel with a winding 252B and a gate element 340B connected in parallel with a winding 352B, respectively.

Each of the Stages 1, 2 and N of the binary shift register of FIG. 2 has an input winding 142A, 242A and 342A, respectively, which is employed in the storage of information in its respective stage. Each of these stages also includes a gate element 160A, 260A and 360A, respectively, for providing an indication of the information stored in its particular stage. Input control lines 30, 31, 32, 34, 36 and 38 are provided for the application of control current pulses A, B, C, D, E and F, respectively, of FIG. 2*a* from suitable pulse sources not shown. These pulses are returned to the respective pulse sources through lines 40, 41, 42, 43, 44, 46 and 48.

In the operation of the shift register of FIG. 2, binary information is entered into the "A" register. According to a further feature of this invention the application of the pulses shown in FIG. 2*a* transfers this binary information into the "B" register for temporary storage, and subsequently transfers this information from the "B" register back to the "A" register, shifted one place to the right. The subsequent application of groups of the pulses shown in FIG. 2*a* shifts this information along the shift register.

The specific operation of the shift register of FIG. 2 will now be described in connection with the pulses illustrated in FIG. 2*a*. In loading the "A" register an A pulse is applied to a control line 30. An input pulse, such as the one illustrated in FIG. 2*a*, is also applied to each of the windings 142A, 242A and 324A in Stages 1, 2 and N, respectively, in which it is desired to store information. The input pulse or pulses are terminated and upon the subsequent termination of the A pulse, a persistent current indicative of a binary One is established in any of the "A" register stages to which an input pulse is applied.

Assume, for example, that a persistent current is stored in the loop $L_{A1}$, which represents a One in Stage 1, and that no information is stored in the Loops $L_{A2}$ and $L_{AN}$ of the Stages 2 and N which represent Zeros in each of these latter stages. The persistent current in the loop $L_{A1}$ makes the gates 150A and 160A resistive, or normal. At this time the output gates 160A, 260A and 360A of the "A" register may be interrogated, and since the gate 160A is resistive it indicates that a One is stored in the loop $L_{A1}$. Pulse B and then pulse C are applied. The B pulse tends to flow through the gate 140B and the winding 152B in Stage 1, the gate 240B and the winding 252B in Stage 2 and the gate 340B and the winding 352B in Stage N. The fraction of the B pulse flowing in the windings 152B, 252B and 352B is insufficient to drive the gates 150B, 250B and 350B resistive. The C pulse is blocked by the resistive gate 150A and therefore flows through the winding 146B, the gate 250A and the gate 350A. The C pulse drives the gate 140B resistive thereby diverting all of the B pulse from this gate into the winding 152B. Upon the termination of the C pulse, the gate 140B goes superconductive, and upon the termination of the B pulse, a persistent current is established in the loop $L_{B1}$. A pulse D is then applied to the line 34 which flows through the windings 144A, 244A and 344A thereby driving the gates 140A, 240A and 340A resistive. When the gate 140A goes resistive, the persistent current in the loop $L_{A1}$ is quenched, or destroyed, thereby clearing the "A" register. At this point it should be apparent that the One which was stored in Stage 1 of the "A" register has been transferred in Stage 1 to the "B" register.

In order to shift this information from Stage 1 of the "B" register to Stage 2 of the "A" register, a second A pulse and then an E pulse are applied to the lines 30 and 36, respectively. The second A pulse tends to flow through the gate 140A and the series circuit including the windings 162A and 152A in Stage 1, the gate 240A and the series circuit including the windings 262A and 252A in Stage 2 and the gate 340A and the series circuit including the windings 362A and 352A in Stage N, The fraction of the A pulse which flows in the windings 152A, 252A and 352A is insufficient to drive the gate elements 150A, 250A and 350A resistive. The E pulse is blocked by the resistive gate 150B (since a persistent current is flowing in the loop $L_{B1}$) and it flows through the winding 248A, the gate 250B and the gate 350B. The E pulse drives the gate 240A resistive thereby diverting the A pulse from that gate to the windings 262A and 252A. When the E pulse terminates, the gate 240A goes superconductive, and upon the subsequent termination of the second A pulse, a persistent current is established in the loop $L_{A2}$. An F pulse then is applied to the line 38 making the gate 140B resistive and thereby destroying the persistent current in the loop $L_{B1}$. It should now be apparent that, by the sequence of operations set forth above, the One state in Stage 1 of the "A" register is transferred to Stage 1 of the "B" register, and subsequently is transferred from Stage 1 of the "B" register to Stage 2 of the "A" register.

Although in the above description information is initially stored in only one stage, according to another feature of the invention, information representative of a One may be stored in any or all of the stages and subsequently shifted through the shift register. Assume, for example, that a One is stored in the loops $L_{A1}$ and $L_{A2}$. When the pulses B, C and D are applied to the shift register, the information stored in the loops $L_{A1}$ and $L_{A2}$ is transferred to the loops $L_{B1}$ and $L_{B2}$, respectively, and the persistent current in the loops $L_{A1}$ and $L_{A2}$ are destroyed. When the subsequent A, E and F pulses are applied to the shift register, the information temporarily stored in the loops $L_{B1}$ and $L_{B2}$ is transferred to the loops $L_{A2}$ and $L_{AN}$, respectively, and the information stored in each of the loops $L_{B1}$ and $L_{B2}$ is destroyed. The subsequent application of B, C, D, A, E and F pulses causes the information now stored in the loops $L_{A2}$ and $L_{AN}$ to be shifted down the shift register. Read-out of the information stored in the shift register is accomplished by interrogating the output gates 160A, 260A and 360A between the termination of an A pulse and the beginning of the subsequent D pulse. When any of these gates is resistive, it is an indication that information is stored in its respective stage. In FIG. 2*a*, note that the pulses B and A are of the same width and that pulses C, D, E and F are of the same width and, therefore, the pulse generators employed in the shift register of FIG. 2 only need be of two basic types.

Reference now is made to FIG. 3 which discloses another binary shift register embodying the principles of the instant invention. The shift register of FIG. 3 includes three stages, each of which employs only three cryotrons. Each of the Stages 1, 2 and N includes a loop or loop circuit $L_{A1}$, $L_{A2}$ and $L_{AN}$, respectively. The first of these loops, $L_{A1}$, is defined by a parallel circuit in which a gate element 170 is connected in parallel with a series circuit including windings 182 and 192. The second of these loops, $L_{A2}$, is defined by a parallel circuit including a gate element 270 connected in parallel with a series circuit including windings 282 and 292. The third loop, $L_{AN}$, is defined by a parallel circuit including a gate element 370 connected in parallel with a series circuit including windings 382 and 392. A plurality of loop circuits $L_{B1}$, $L_{B2}$ and $L_{BN}$ are employed in the shift register of FIG. 3 for the temporary storage of information. The first of these temporary storage loops, $L_{B1}$, includes the parallel connection of a gate element 190 with a winding 276. This loop circuit, $L_{B1}$, as well as the loop circuits $L_{B2}$ and $L_{BN}$, interconnect two adjacent stages. The second temporary storage loop, $L_{B2}$, includes a gate element 290 in parallel with a winding 376. The third temporary storage loop, $L_{BN}$, includes a gate element 390 connected in parallel with a winding of a cryotron of a next succeeding stage if more than three stages are employed. If Stage N is the last stage, as is illustrated, the loop $L_{BN}$ need not be employed.

Each of the Stages 1, 2 and N of the shift register of FIG. 3 has an input winding 172, 272 and 372, respectively, which is used in the storage of information in its respective stage. Each of these stages also includes a gate element 180, 280 and 380, respectively, for providing an indication of the information stored in its particular stage. Input control lines 60, 62, 64 and 66 are provided to which control current pulses A, B, C and D of FIG. 3*a* are applied, respectively, from suitable pulse sources not shown. These pulses are returned to the respective pulse sources through lines 70, 72, 74 and 76.

According to another feature of the present invention, binary information is entered into one or more of the stages of the binary shift register of FIG. 3. By applying the pulses shown in FIG. 3A this information is transferred from the loops $L_{A1}$, $L_{A2}$ and $L_{AN}$ to the temporary storage loops $L_{B1}$, $L_{B2}$ and $L_{BN}$, respectively, and subsequently from the $L_B$ loops to the $L_A$ loops of the next succeeding stage thereby resulting in the information being shifted one place to the right.

The specific operation of the binary shift register of FIG. 3 will now be described in connection with the pulses illustrated in FIG. 3*a*. In loading a stage of the shift register, an A pulse is applied to the line 60. The A pulse flows through the gate 170 and the series circuit including the windings 182 and 192 in Stage 1. the gate 270 and the series circuit including the windings 282 and 292 in Stage 2 and the gate 370 and the series circuit including the windings 282 and 292 in Stage N. The fraction of the A pulse which flows through the windings 182, 192, 282, 292, 382 and 392 because of the inverse inductive split of currents between the parallel paths in the superconductive circuit is insufficient to drive any of the gate elements, 180, 190, 280, 290, 380 and 390, within these windings resistive. A One is stored in any desired stage by applying an input pulse to the windings 172, 272 and 372. Upon the termination of an input pulse or pulses, the gates 170, 270 and 370 to which an input pulse is applied go superconductive. Subsequently, when the A pulse is terminated, a persistent current is established in loops $L_{A1}$, $L_{A2}$ and $L_{AN}$ in the Stages 1, 2 and N, respectively, to which an input pulse is applied.

Assume that a persistent current, which is indicative of a One, has been stored in the loops $L_{A1}$ and $L_{A2}$. The persistent current in the loop $L_{A1}$ makes the gates 180 and 190 resistive, and the persistent current in the loop $L_{A2}$ makes the gates 280 and 290 resistive. Pulse B is applied and then pulse C is applied. The pulse B cannot flow through the resistive gates 190 and 290 and, therefore, this pulse flows through the winding 276, the winding 376 and the gate 390. The gate elements 270 and 370 are of low gain; that is, they do not go resistive or normal unless almost all of the pulse B is present. The gate element 170 is also of low gain. The gate elements 190, 290 and 390 are of high gain and they go resistive when a small fraction of the stored persistent current is present in the loops $L_{A1}$, $L_{A2}$ and $L_{AN}$, respectively. When the C pulse is applied, it flows through windings 174, 274 and 374 thereby driving the gates 170, 270 and 370 resistive. As the gates 170 and 270 go resistive the persistent current in the loops $L_{A1}$ and $L_{A2}$ is destroyed thereby allowing the gates 190 and 290 to go superconductive. Upon the subsequent removal of the B pulse a persistent current is established in the loops $L_{B1}$ and $L_{B2}$. The persistent current in $L_{B1}$ makes the gate 270 resistive thereby conditioning Stage 2 for the storage of a persistent current in loop $L_{A2}$. The persistent current in the loop $L_{B2}$ makes the gate 370 resistive thereby conditioning Stage N for the storage of a persistent current in the loop $L_{AN}$.

A second A pulse and a D pulse are applied to the shift register. The A pulse flows mainly through the gate 170, but a fraction of this pulse flows through the windings 182 and 192 which is insufficient to drive the gates 180 and 190 resistive. The A pulse cannot flow through the resistive gates 270 and 370 and, therefore, it flows through the windings 282 and 292 of Stage 2 and the windings 382 and 392 of Stage N. When the D pulse is applied, it flows through windings 194, 294 and 394 thereby driving the gates 190, 290 and 390 resistive. As the gates 190 and 290 go resistive, the persistent currents in the loops $L_{B1}$ and $L_{B2}$ are destroyed which allows the gates 270 and 370 to go superconductive. Upon the subsequent termination of the A pulse, a persistent current is established in the loops $L_{A2}$ and $L_{AN}$. It may be noted that in this illustration, depending upon the time constants of the circuit, the diversion of the A pulse through the winding 292 may destroy the persistent current in the loop $L_{B2}$ before the start of the D pulse. However, in other instances of circuit operation, such as the shifting of the information in Stage 2 to Stage N, there will not be a complete diversion of the A pulse through the winding 292 and, hence, the D pulse flowing through the winding 294 will cause the gate 290 to go resistive thereby destroying the persistent current in the loop $L_{B2}$. Subsequent sets of the B, C, A and D pulses transfer the information from the $L_{A2}$ loop to the $L_{B2}$ loop and subsequently to the $L_{AN}$ loop, and these pulses destroy the persistent current in the $L_{AN}$ loop since that loop is in the last stage shown in the shift register.

Although the gate element 390 and the windings 392 and 394 thereon have been illustrated in Stage N of FIG. 3, these components are not necessary since Stage N is the final stage of the shift register illustrated. However, if the winding 392 is eliminated, an inductance of equal value should be employed in its place to maintain the proper inverse inductive split of the A pulse in Stage N.

In the same manner as described above, a One may be stored in any or all of the stages of the shift register and shifted from stage to stage down the shift register in response to the application of sets of the pulses of FIG. 3*a*. The information stored in any stage of the shift register may be read out by interrogating the output gates 180, 280 and 380 between the termination of an A pulse and the beginning of the next C pulse. Any of the output gates 180, 280 and 380 which is resistive at the time of interrogation represents that a persistent current is present in its respective $L_A$ loop circuit and consequently that a One is stored in its respective stage. It should now be apparent that information stored in a stage of the shift register of FIG. 3 is shifted to a temporary persistent current storage loop and then to a persistent current storage loop in the next succeeding stage, and upon the successive application of control pulses, this information is shifted from stage to stage along the shift register.

From the foregoing description of the embodiments of the present invention it should be apparent that a shift register is provided comprising a plurality of stages each of which includes a persistent current loop circuit into which information may be loaded thereby establishing a persistent current in any desired stage. Control pulses applied to the shift register transfer the information to a temporary persistent current storage loop, and subsequently transfer this information to a persistent current storage loop in the next succeeding stage. Also provided by this invention is a shift register in which persistent currents are established of a magnitude indicative of decimal bits. Upon the application of groups of input pulses, a decimal bit is first transferred to a temporary persistent current storage loop circuit and then transferred to a persistent current storage loop circuit in the next succeeding stage. Subsequent applications of control pulses shift a decimal bit from stage to stage down the shift register.

While the fundamental features of the invention have been illustrated and described in certain arrangements, it will be understood that various changes in the form and details of the device illustrated and in its operation may be made by those skilled in the art without departing from the spirit of the invention.

What is claimed is:

1. A shift register comprising: a plurality of stages each of which includes a plurality of cryotrons; a first plurality of loop circuits in which persistent currents may exist simultaneously and a second plurality of loop circuits in which persistent currents may exist simultaneously, each of said loop circuits including two of the cryotrons of each stage; first means to establish a first persistent current in a first of said loop circuits; and second means to apply pulses to the shift register, whereby upon the occurrence of said pulses a second persistent current is established in another of said loop circuits.

2. A shift register comprising: a plurality of stages each of which includes a plurality of cryotrons; a first plurality of loop circuits each of which is in one of said stages, each of said loop circuits including at least two of the cryotrons of each stage; a second plurality of loop circuits each of which includes one of the cryotrons of one stage and one of the cryotrons of the next succeeding stage; first means to establish a first persistent current in one of said plurality of first loop circuits; and second means to apply pulses to the shift register, whereby the first persistent current is destroyed and a second persistent current is established in one of said second plurality of loop circuits.

3. A shift register comprising: a plurality of stages each of which includes a plurality of cryotrons; a first plurality of loop circuits each of which is in one of said stages, each of said loop circuits including two of the cryotrons of each stage; a second plurality of loop circuits each of which is in one of said stages, each of said loop circuits including another two of the cryotrons of each stage; first means to apply pulses to one of said first plurality of loop circuits whereby a first persistent current is established therein; and second means to apply pulses to the shift register, whereby a second persistent current is established in one of said second plurality of loop circuits and said first persistent current is destroyed.

4. A shift register as in claim 3 wherein the persistent current established in the first loop circuit is indicative of binary information.

5. A shift register as in claim 3 wherein one of the pulses applied by said first means is of a magnitude indicative of a decimal value and each of the established persistent currents is of a magnitude indicative of said decimal value.

6. A shift register comprising: a plurality of stages each of which includes a plurality of cryotrons; a plurality of loop circuits at least two of which are each in respective first and second stages, each of said loop circuits including at least two of said plurality of cryotrons of each stage; first means to establish a first persistent current in each of said two loop circuits; and second means to apply pulses to the shift register to establish a second persistent current in each of another two of said plurality of loop circuits.

7. A superconductive shift register comprising: a first register and a second register; each of said registers having a plurality of cryotrons connected in series to form a plurality of rows, and each of said cryotrons having a gate element and winding means thereon for controlling the state of said gate element; the winding means of each of said cryotrons of the first of said rows of each register being connected in parallel with the gate element of each of said cryotrons of the second of said rows of each register thereby forming a plurality of loop circuits in each register; additional winding means on each of said gate elements of said second row of said first register to which information pulses may be applied; first means to apply an information pulse and a control pulse to the first of said cryotrons of said second row of said first register to establish a first persistent current representative of informaiton in a first of said loop circuits of said first register; and second means to apply a set of control pulses to said shift register, whereby upon the application of said control pulses said first persistent current is destroyed and a second persistent current is established in the first of said loop circuits of said second register.

8. A superconductive shift register as in claim 7 including third means to apply a second set of control pulses to said shift register, whereby upon the application of said second set of control pulses said second persistent current is destroyed and a third persistent current is established in a second of said loop circuits of said first register.

9. A superconductive decimal shift register comprising: a first register and a second register; each of said registers having a plurality of cryotrons connected in series to form a plurality of rows; each of said cryotrons having a gate element and a plurality of windings thereon; the first of said plurality of windings of each of said cryotrons of the first of said rows in each of said registers being connected in parallel with a gate element of each of said cryotrons of the second of said rows in each of said registers thereby forming a plurality of loop circuits in each register; first means to apply an input pulse to the second of said plurality of windings of a first of said plurality of cryotrons of said first register; second means to apply a first group of quantized pulses to the second row of cryotrons of said first register, whereby upon the application of a pulse from said first means and a particular pulse from said second means, a first persistent current is stored in a first of said plurality of loop circuits in said first register; third means to apply a second group of quantized pulses to the shift register; and fourth means to apply control pulses to the shift register; whereby upon the occurrence of a particular one of said first group of quantized pulses, a particular control pulse from said fourth means and a particular one of said second group of quantized pulses, said first persistent current is destroyed and a second persistent current is stored in a first of said plurality of loop circuits in said second register.

10. A shift register as in claim 9; including fifth means to apply a third group of quantized pulses to the shift register; sixth means to apply a fourth group of quantized pulses to the shift register; and seventh means to apply control pulses to the shift register; whereby upon the occurrence of a particular one of said third group of quantized pulses, a particular one of said control pulses from said seventh means and a particular one of said fourth group of quantized pulses said second persistent current is destroyed and a third persistent current is established in a second of said plurality of loop circuits in said first register.

11. A shift register comprising: a plurality of stages each of which includes a plurality of cryotrons; a first plurality of loop circuits each of which is in one of said stages and each of which includes two of the cryotrons of each stage; a second plurality of loop circuits each of which is in one of said stages and each of which includes another two of the cryotrons of each stage; first means to apply pulses to certain of said loop circuits whereby persistent currents are established therein; and second means to apply discrete pulses to the shift register, whereby certain of the discrete pulses transfer certain of the persistent currents to certain of said second plurality of loop circuits.

12. A superconductive device comprising: a plurality of stages each of which includes a plurality of cryotrons; a first group of loop circuits at least one of which is in one of said plurality of stages; a second group of loop circuits at least one of which is in one of said plurality of stages; each of said loop circuits including two of the cryotrons of each stage; first means to establish persistent currents representative of decimal information in the loop circuits of said first group of loop circuits; and second means to apply groups of pulses to the superconductive device whereby one group of pulses selectively transfers a persistent current indicative of one decimal value to a loop circuit of the second group of loop circuits, and another group of pulses selectively transfers a persistent current indicative of a second value to another loop circuit of the second group of loop circuits.

13. A shift register comprising: a plurality of stages each of which includes a plurality of cryotrons, a plurality of loop circuits each of which includes two of the cryotrons of each stage; first means to establish persistent currents indicative of decimal information in certain of said loop circuits; and second means to apply pulses to the shift register, whereby at least respective ones of said pulses transfer respective persistent currents of similar decimal value to other of said loop circuits.

14. A shift register as defined in claim 13 wherein certain of said pulses are indicative of different decimal values and different ones of these pulses cause the transfer of persistent currents of different decimal values.

15. A shift register comprising: a plurality of stages each of which includes a plurality of cryotrons; a plurality of loop circuits each of which includes two of the cryotrons of each stage; first means to establish persistent currents of different magnitudes in certain of said loop circuits; and second means to apply pulses to the shift register, whereby certain ones of the pulses selectively transfer a persistent current of one magnitude to other of said loop circuits, and certain other ones of said pulses selectively transfer a persistent current of another magnitude.

References Cited in the file of this patent

UNITED STATES PATENTS

| | | |
|---|---|---|
| 2,832,897 | Buck | Apr. 29, 1958 |
| 2,888,201 | Housman | May 26, 1959 |